(12) United States Patent  (10) Patent No.: US 8,653,882 B2
Syed et al.  (45) Date of Patent: Feb. 18, 2014

(54) CONTROLLING OVER VOLTAGE ON A CHARGE PUMP POWER SUPPLY NODE

(75) Inventors: Taif A. Syed, Sunnyvale, CA (US); Sang Y. Youn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/433,768

(22) Filed: Mar. 29, 2012

(65) Prior Publication Data

US 2013/0257521 A1  Oct. 3, 2013

(51) Int. Cl.
*G05F 1/10* (2006.01)

(52) U.S. Cl.
USPC ............................................ 327/536; 363/60

(58) Field of Classification Search
USPC ................................ 327/536; 363/60; 307/110
See application file for complete search history.

(56) References Cited

U.S. PATENT DOCUMENTS

| | | | |
|---|---|---|---|
| 6,255,896 B1 * | 7/2001 | Li et al. | 327/536 |
| 6,278,294 B1 * | 8/2001 | Taniguchi | 326/80 |
| 6,559,689 B1 | 5/2003 | Clark | |
| 6,859,091 B1 | 2/2005 | Nicholson et al. | |
| 7,034,604 B2 * | 4/2006 | Minteer | 327/540 |
| 7,142,041 B2 * | 11/2006 | Somerville | 327/536 |
| 7,170,271 B2 * | 1/2007 | Coffey et al. | 323/284 |
| 7,190,598 B1 | 3/2007 | Alenin | |
| 7,295,198 B2 * | 11/2007 | Nishimura | 345/211 |
| 7,379,058 B2 * | 5/2008 | Toyozawa et al. | 345/211 |
| 7,675,239 B2 * | 3/2010 | Marhefka et al. | 315/169.3 |
| 7,821,511 B2 | 10/2010 | Nakajima | |
| 7,990,204 B2 * | 8/2011 | Kim et al. | 327/536 |
| 8,164,379 B2 * | 4/2012 | Chuang et al. | 327/536 |
| 2005/0140427 A1 * | 6/2005 | Kamijo | 327/536 |
| 2011/0204961 A1 * | 8/2011 | Galal et al. | 327/536 |
| 2012/0212201 A1 * | 8/2012 | Lee et al. | 323/282 |

* cited by examiner

*Primary Examiner* — Thomas J Hiltunen

(74) *Attorney, Agent, or Firm* — Blakely, Sokoloff, Taylor & Zafman LLP

(57) ABSTRACT

A charge pump driver circuit has a first charge switch that couples a first node of a flying capacitor to a first power supply node, and a second charge switch that couples a second node of the capacitor to a second power supply node. Control circuitry is coupled to open the second charge switch and discharge the second node of the capacitor, in response to a control signal. Other embodiments are also described and claimed.

17 Claims, 3 Drawing Sheets

CONTROLLING OVER VOLTAGE ON A CHARGE PUMP POWER SUPPLY NODE

FIELD

An embodiment of the invention is directed to a technique for alleviating over voltage on a power supply node for a charge pump during a display panel power down sequence. Other embodiments are also described.

BACKGROUND

Over voltage on a power supply line is usually not a problem if the power supply circuit is designed to provide a regulated dc output voltage. In the event, however, that an over voltage is expected for whatever reason, there are at least two techniques that may be used to alleviate such a situation. In one instance, a series resistor is placed between the power supply node and the "load" circuitry that will be making use of the power. That, however, may not work for the case where an appreciable amount of current is expected to be drawn through the power supply node, because the series resistor will, in that case, cause a substantial voltage drop. Another form of over voltage protection uses an active, transient voltage suppressor device that is connected in parallel with the power supply node and ground. An example is a transient voltage suppression diode that operates by shunting excess current when the power supply node voltage exceeds an avalanche breakdown potential. This is in effect a clamping device that suppresses all over voltages above its breakdown voltage, and automatically resets when the over voltage goes away. The transient voltage suppression diode, however, may be difficult to integrate with low cost, large scale integration digital logic circuitry, e.g. in a complementary metal oxide semiconductor (CMOS) integrated circuit ("IC") die.

SUMMARY

An embodiment of the invention is an electronic over voltage control circuit that is particularly suitable for controlling an over voltage condition that may appear on a power supply node of a charge pump circuit. The power supply node also feeds a display driver integrated circuit (in which the charge pump circuit may be integrated that controls a display panel). The charge pump aspect of the circuit features a flying capacitor, and a charge pump driver circuit that has a first charge switch which couples a first node of the capacitor to a first power supply node. In addition, a second charge switch couples a second node of the capacitor to a second power supply node. The two power supply nodes may carry, for instance, positive and negative power supply voltages, where at least the positive power supply voltage is also used by circuitry that is part of the display driver IC. The over voltage condition may occur on the positive power supply node, during a power down sequence for the display in which the negative power supply voltage goes to zero before the positive power supply voltage drops to zero. To alleviate the over voltage situation that may be created due to that particular power down sequence, control circuitry is provided that is coupled to open at least the second charge switch, and then immediately discharge the second node of the capacitor, in response to a control signal. The second node of the capacitor may be discharged down to a low voltage, e.g. zero volts or ground, before the power down sequence ends. When the negative power supply voltage goes to zero prior to the positive power supply voltage, an over voltage condition is avoided on the positive power supply node, because the second charge switch is open at this point. In addition, the flying capacitor has been placed into a predictable, discharged state. These benefits may be achieved without requiring any external circuit elements that are outside of the display driver integrated circuit. In other words, the constituent components of the control circuitry may be advantageously integrated within the display driver IC as standard large scale integration transistors, thereby avoiding the need for a specially manufactured transient voltage suppression device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
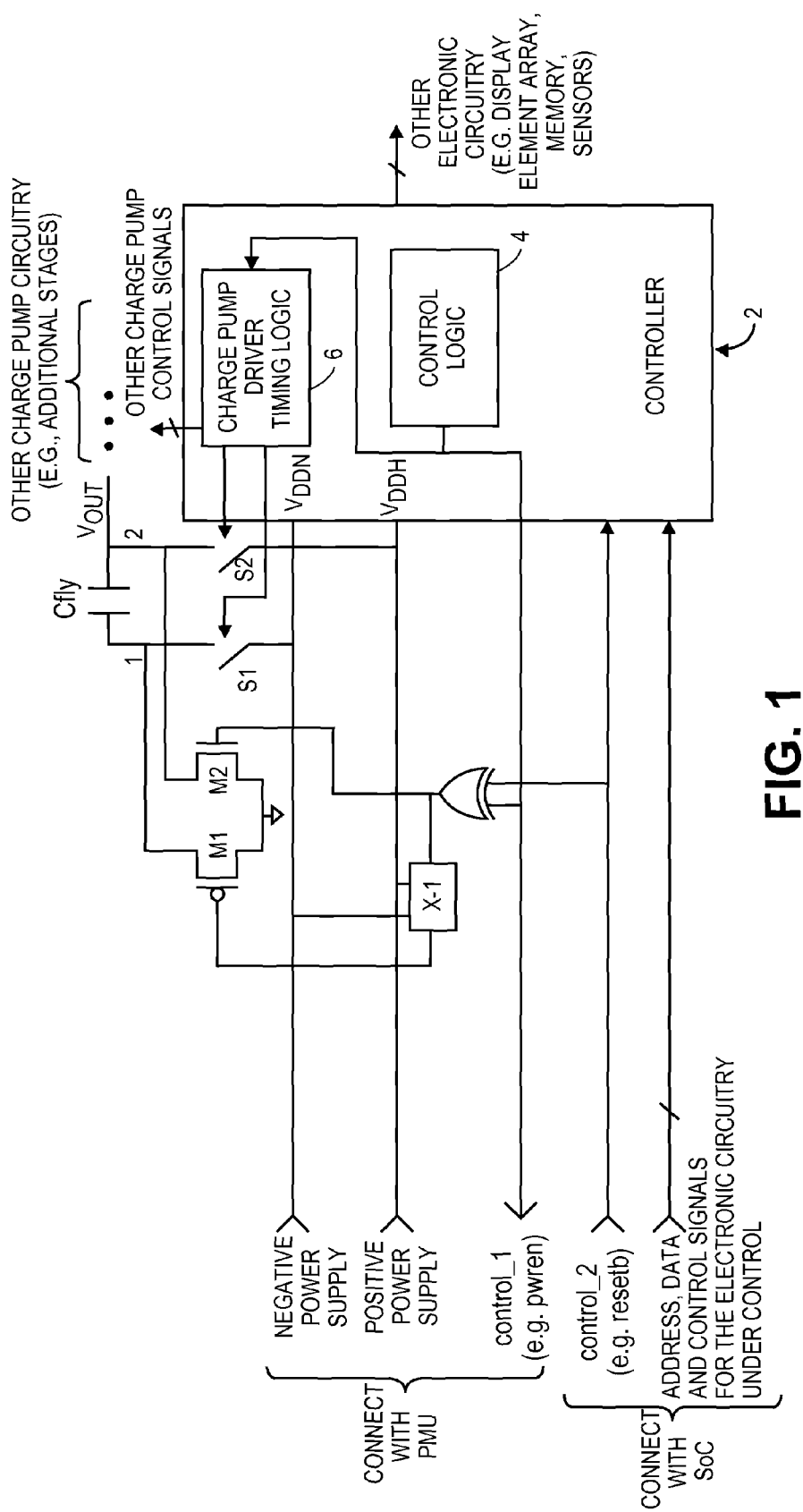
FIG. 1 is a combined circuit schematic and block diagram of an electronic over voltage control circuit.

FIG. 1 is a combined circuit schematic and block diagram of an electronic over voltage control circuit. The circuitry described here may alleviate over voltage on a charge pump power supply node $V_{DDH}$. The charge pump circuit includes charge pump driver and timing logic 6 that produces charge pump control signals which may be typical periodic binary square wave signals that are coupled to control the opening and closing of solid state switches S1, S2, so as to produce an output voltage $V_{out}$ that is higher than an input positive power supply voltage at $V_{DDH}$. In this case, the charge pump also uses a negative power supply node $V_{DDN}$. The charge pump driver circuitry includes a first charge switch S1 that couples node 1 of a flying capacitor $C_{fly}$ to the first power supply node $V_{DDN}$, and a second charge switch S2 that couples node 2 of $C_{fly}$ to the second power supply node $V_{DDH}$. $V_{DDN}$ and $V_{DDH}$ are thus selectively connected, by the charge pump driver circuit, including charge pump driver timing logic 6 and switches S1, S2, to nodes 1, 2 of $C_{fly}$, respectively.

In one embodiment, $V_{DDH}$ is to receive a positive power supply voltage (e.g., +5.7V) while $V_{DDN}$ is to receive a negative power supply voltage (e.g., −5.7V). It should be noted that $V_{DDN}$ and $V_{DDH}$ need not be equal in absolute value.

Also, it may alternatively be the case that $V_{DDN}$ is not a negative power supply voltage but rather is a positive power supply voltage that is smaller than $V_{DDH}$ (i.e., 0 Volts<$V_{DDN}$<$V_{DDH}$), or larger than $V_{DDH}$ (i.e., 0 Volts<$V_{DDH}$<$V_{DDN}$).

The control circuitry that helps maintain $C_{fly}$ in a predictable discharged state, in this example, includes an n-channel field effect transistor M2 that is coupled to discharge node 2 of $C_{fly}$ to a predetermined lower voltage, in this example ground or zero volts, in accordance with a control signal Control_1. Logic gate circuitry responds to Control_1 (in this case through one input of an XOR gate) and generates the gate signals for controlling M1, M2. For M1 being a p-channel device (whose effective drain is connected to ground and whose source is connected to node 1 of $C_{fly}$) a special polarity inverter X-1 is used to produce a voltage that has opposite polarity of the voltage at its input. This enables the p-channel device to be properly turned on when the output of the XOR gate is a logic high (being in this case a positive voltage). In addition, to alleviate over voltage on the supply node $V_{DDH}$ the control circuitry also includes that portion of the driver timing logic 6 (not shown) that is coupled to open the switch S2, in response to the control signal Control_1, prior to $V_{DDN}$ and $V_{DDH}$ going to zero volts. Upon opening S2, the capacitor $C_{fly}$ should then be flushed, that is at least its node 2 should be discharged to a sufficiently small voltage, e.g. ground or zero volts, by closing switch M2. Also, closing the switch M1 serves to discharge node 1 of $C_{fly}$ to a predetermined, low voltage (e.g., ground or zero volts). In other words, in response to the Control_1 signal being generated, $V_{DDH}$ is disconnected from node 2 of $C_{fly}$, $V_{DDN}$ is disconnected from node 1 of $C_{fly}$, and $C_{fly}$ is then flushed by discharging both of its nodes 1, 2. Discharging both nodes 1, 2 will ensure that no residual charge remains on $C_{fly}$; otherwise the capacitor may be in an unknown state the next time the charge pump is enabled or activated. A particular embodiment of the invention, in which such a technique for reducing the likelihood of over voltage may be used, will now be described.

The charge pump circuit described here operates as follows. There are two phases of operation that are repeated periodically by the charge pump, namely a charge phase and a boost or transfer phase, also referred to as a pump phase. During the charge phase, the flying capacitor $C_{fly}$ is charged, by virtue of the switches S1, S2 being closed, to a voltage being the difference between $V_{DDH}$ and $V_{DDN}$. Thereafter, operation continues with the transfer phase in which the charge that is now stored in $C_{fly}$ is transferred or "flies" into another capacitor (not shown), or otherwise becomes available to a load that is coupled to node 2 of $C_{fly}$ (labeled here as $V_{out}$). The latter is then used by a controller 2 in order to drive other electronic circuitry, namely in this particular example a display element array of a display panel (not shown). FIG. 1 also shows additional charge pump control signals that are not relevant but may be produced in order to, for instance, further boost the voltage $V_{out}$, if needed.

Now, a problem may occur during a power down or power off sequence in which the display panel or display element array is powered down (e.g., powered off or placed into a sleep state), where, in particular, $V_{out}$ is to drop to a very low voltage (e.g., ground or zero volts). As depicted in the timing diagram of FIG. 2, the power down sequence involves the power control signal Control_1 going from a logic high level to a logic low level, where this in turn signals the external power supply circuits to bring the negative power supply voltage $V_{DDN}$ to zero, and then bring the positive supply voltage $V_{DDH}$ to zero in that order. This particular sequence of powering down the negative and positive supply nodes is needed for an orderly power down or shut down of the display element array and its associated driver circuitry (not shown but that may be deemed part of the controller 2). As seen in the timing diagram of FIG. 2, while Control_1 remains at the logic high level, the control of the charge switches S1 and S2 is pursuant to conventional charge pump driver timing so that the switches S1, S2 are operated in a periodic charge and boost (or transfer) sequence. Upon Control_1 transitioning from a logic high to a logic low level, it was previously the case that switch S2 would remain closed such that when the negative supply $V_{DDN}$ was taken to zero volts as shown, this would induce an over voltage condition on the positive supply node $V_{DDH}$, due to $C_{fly}$ coupling the positive and negative power supply nodes to each other (by virtue of switches S1, S2 remaining closed).

Figure 2:
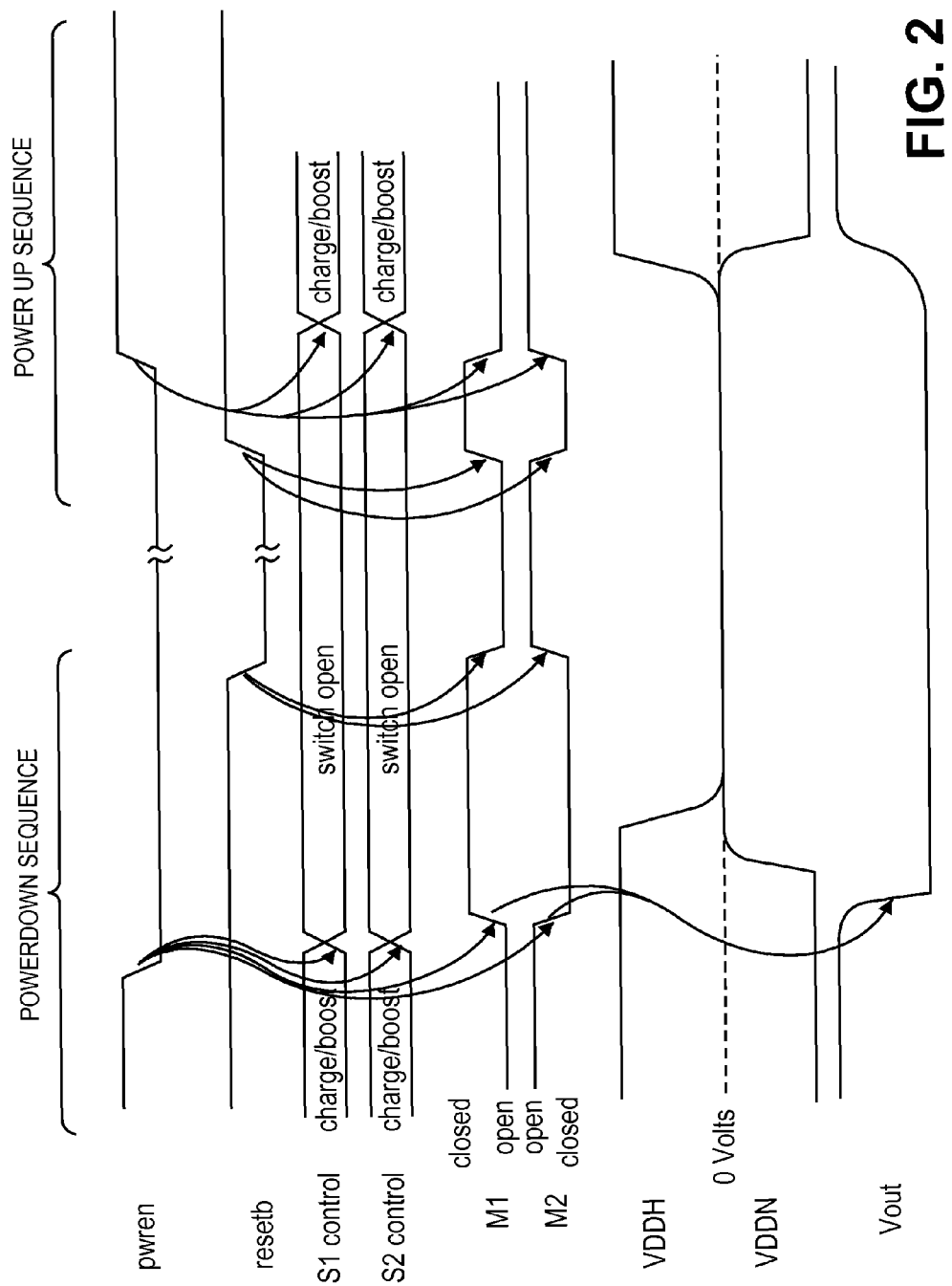
FIG. 2 is a timing diagram of the relevant signals used in a method for alleviating over voltage on a charge pump power supply node.

In accordance with an embodiment of the invention, and referring to the timing diagram in FIG. 2, when Control_1 transitions to its logic low state, this causes S1 and S2 to both be opened, and immediately followed by switches M1, M2 being closed. This particular sequence not only ensures that $C_{fly}$ is decoupled from the negative and positive power supply nodes $V_{DDN}$, $V_{DDH}$ thereby alleviating over voltage on $V_{DDH}$ when $V_{DDN}$ goes to zero first, but also that $C_{fly}$ remains discharged in a known or predetermined state until the charge pump circuit is to be activated again (e.g., in a subsequent power up sequence). As seen in FIG. 2, closing the switches M1, M2 also drops the output voltage $V_{out}$ quickly to the predetermined, lower voltage (e.g., ground or zero volts) thereby achieving the desired goal in this part of the power down sequence.

It should be noted that the power down sequence depicted in FIG. 2 may continue (after $V_{out}$ has dropped to zero volts), with additional actions taking place with respect to the controller 2 that are not described here. This may be referred to as a "graceful" power down sequence in which various internal power rails and display element driver circuits are powered down in an orderly fashion, in order to avoid logic circuit latch up issues for instance. This orderly shutdown may be orchestrated by control logic block 4 within the controller 2, which is also responsible for generating the Control_1 power control signal.

As explained above, the power control signal Control_1 may be used by the controller 2 to request that the supply nodes $V_{DDH}$, $V_{DDN}$ be powered down. In one example, described here, the power control signal Control_1 may be a binary power enable (pwren) signal, that is deasserted by the control logic 4 in order to signify a request to an external power supply to power down the supply nodes $V_{DDH}$, $V_{DDN}$. In one embodiment, pwren is asserted in order to signify a request by the controller 2, to the external power supply, to power up the supply nodes $V_{DDH}$, $V_{DDN}$. This dual use of Control_1 is depicted in the timing diagram of FIG. 2, which shows a power down sequence in which pwren transitions from a logic high to a logic low, and a power up sequence in which pwren transitions from logic low to logic high. It should be noted that while this is an efficient way to indicate power down and power up requests, alternatives are possible, including, using two different control signals for indicating the power up and power down requests, or using different logic levels to indicate those transitions.

In the example depicted in FIG. 2, there is a further control signal Control_2 that may be used in conjunction with Control_1, in order to achieve the graceful power down and power up sequences. In this embodiment, Control_2 is a resetb signal, or reset active low, which is to be asserted externally from the controller 2 (in contrast to the pwren signal which is asserted by the controller 2). The resetb signal may be provided by a system-on-a-chip, SoC (not shown), in addition to other address, data and control signals that give commands to the controller 2 for operating the downstream electronic circuitry (e.g., the display element array). Assertion of resetb causes the controller 2 to enter into a previously predetermined or known state that enables it to more easily and more gracefully power up subsequently. For the power down sequence, the controller 2 performs various known actions for graceful power down, between the transitions of pwren and resetb.

For the power up sequence, the time interval between the transition in resetb to the transition in pwren allows the controller 2 to conduct known actions that prepare it for powering up the downstream electronic circuitry (e.g., initializing counters). Referring to FIG. 2, upon resetb being deasserted, and while pwren remains deasserted, switches M1, M2 are closed so as to place the flying capacitor $C_{fly}$ into a known, discharged state in preparation for the charge pump to begin operation. The latter occurs when pwren is then reasserted (in this example, transitions from a logic low to a logic high), whereupon first the switches M1, M2 are both opened (thereby releasing the capacitor or stopping its discharge), and then the charge pump switches S1, S2 are allowed to be pulsed by the charge pump driver timing logic 6 in accordance with the charge and boost phases (thereby raising the output voltage $V_{out}$ as shown). In this power up sequence, note how the positive supply $V_{DDH}$ was raised prior to $V_{DDN}$ going to its negative value.

Figure 3:
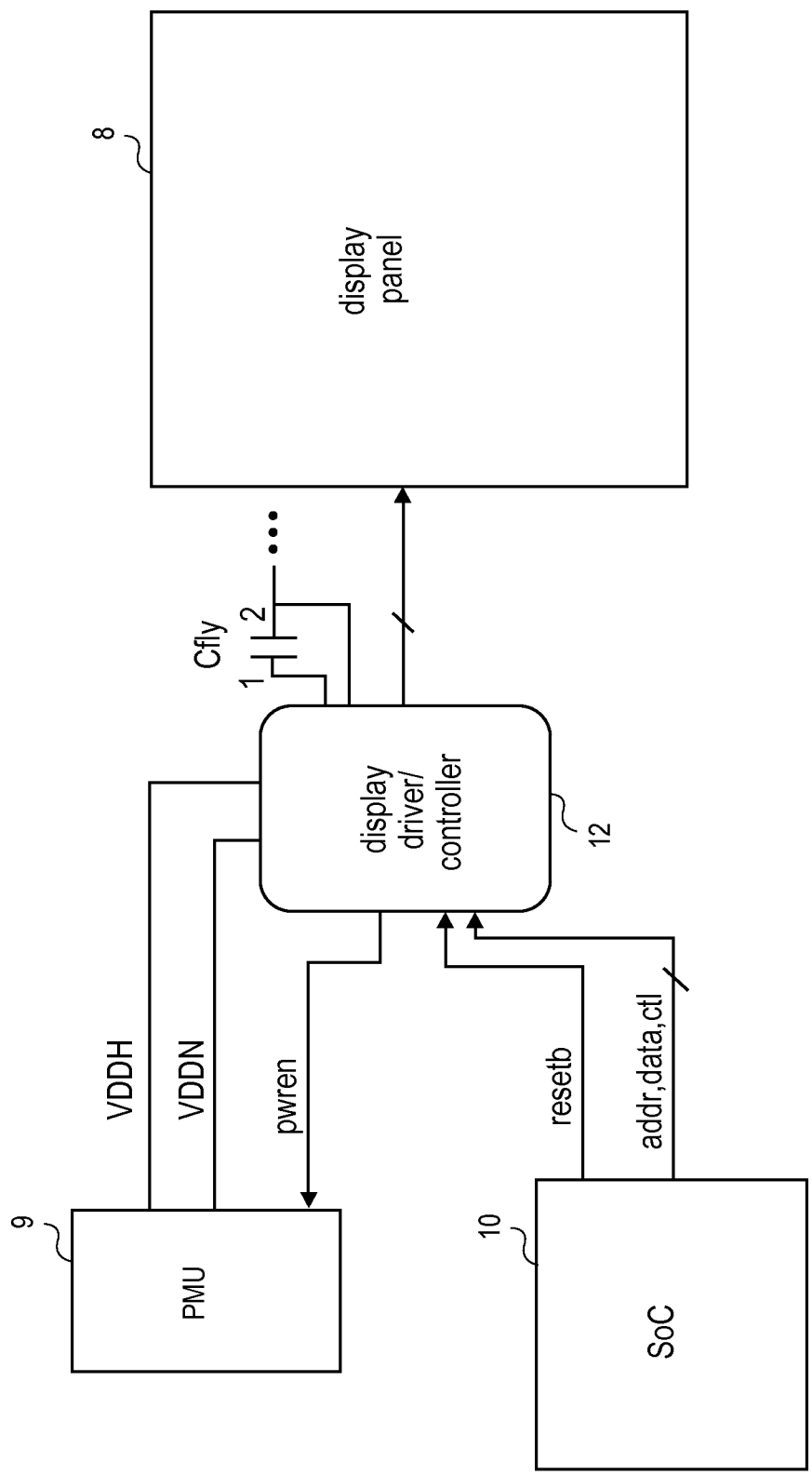
FIG. 3 is a combined circuit schematic and block diagram of an electronic system in which an over voltage control circuit has been integrated with a display driver.

Turning now to FIG. 3, a combined circuit schematic and block diagram of an electronic system in which an over voltage control circuit has been integrated with a display driver is shown. The system may be, for example, a desktop computer, a laptop computer, a tablet computer, a smart phone, or other consumer electronic device having a display panel 8 (e.g., a liquid crystal display, LCD, panel). A display driver or controller 12 provides a boosted voltage for operating the display panel 8, together with address, data and control signals (e.g., gate drive signals, column data signals, and associated timing or clock signals for an LCD element array). Higher level signals for operating the display panel 8, including address, data, control and power up and power down commands, are provided by the SoC 10. As an alternative to the SoC 10, the control signals for managing the display panel 8 may come from a central processing unit (CPU), an applications processor, or a high level graphics or display controller. The needed power supply voltages for operating the display panel 8 are provided by a power management unit (PMU) 9, which includes the needed power supply circuitry for generating the needed regulated dc voltages at $V_{DDH}$ and $V_{DDN}$. The PMU 9 is configured to, during a power down operation for the display panel 8, bring the negative power supply voltage $V_{DDN}$ to zero before dropping the positive power supply voltage $V_{DDH}$ to zero. The PMU 9 performs this power down and power up, in this example, in response to a pwren signal which is generated (asserted and/or deasserted) by the display driver 12. The display driver 12 may also include on-chip control circuitry and charge pump driver circuitry as described above in connection with FIG. 1, which uses the flying capacitor $C_{fly}$ to produce a boosted voltage $V_{out}$ for use by the display panel 8.

In operation, in the system of FIG. 3, a power up sequence may begin with the SoC 10 sending a command (e.g., via the digital address, data and control signal lines) to the display driver 12, to prepare the display panel 8 for power up. This may begin, referring now to the timing diagram of FIG. 2 and the power up sequence shown therein, by deasserting resetb (in this example, raising it from logic low to logic high). When reset is toggled in this manner, the display driver 12 responds by closing switches M1, M2 to thereby flush the flying capacitor (see FIG. 1). Note that at this stage, S1, S2 remain open such that the capacitor is disconnected or decoupled from the power supply nodes $V_{DDH}$, $V_{DDN}$. After additional actions (not shown) are performed by the display driver 12 in preparation for power up of the panel, the display driver 12 asserts pwren (in this case raising it from logic low to logic high). This causes two actions, namely that M1, M2 are opened (thereby releasing $C_{fly}$ in preparation for activating the charge pump) and requesting the PMU 9 to power up the supply nodes $V_{DDH}$, $V_{DDN}$. The PMU 9, in response to detecting the toggling of pwren, will activate its power supply circuitry to, in this particular example, raise $V_{DDH}$ to the positive supply voltage, prior to taking $V_{DDN}$ to its negative supply voltage. At this point or slightly prior, the charge pump circuit can start to selectively connect the power supply nodes to the first and second nodes of $C_{fly}$, in accordance with a periodic sequence, in order to generate the boosted voltage $V_{out}$. At this point, the display panel 8 may be deemed powered up and ready for operation.

The system in FIG. 3 may also operate in the following power down sequence, where the display panel 8 is powered down. Operation may begin with the SoC 10 sending a command to the display driver 12 to prepare for powering down the display panel 8. The display driver 12 then responds to this command, by toggling pwren (see FIG. 2), in this example from a logic high to a logic low. The latter causes the following two actions: charge switches S1, S2 are switched to their open states thereby decoupling $C_{fly}$ from $V_{DDH}$, $V_{DDN}$; followed by M1, M2 being closed to thereby flush C. The PMU 9 also responds to the toggling of pwren, by taking $V_{DDN}$ back to zero volts, followed by dropping $V_{DDH}$ to zero volts. At this point, the output voltage $V_{out}$ to the display panel may drop to zero such that the panel may be deemed to be powered off. The power down sequence ends when the SoC 10 asserts resetb, thereby placing the display driver 12 in a known (reset) state. The assertion of resetb in this example also causes switches M1, M2 to open thereby releasing the capacitor $C_{fly}$ in preparation for the next power up sequence. It should be noted that the time interval between a power down sequence and the next or adjacent power up sequence may be relatively short, on the order of milliseconds, for example, such that the flushing of the capacitor $C_{fly}$ both during the power down sequence and at the beginning of the power up sequence may provide more reliable operation, particularly when the charge switches 51, S2 may be left open during the transition between the power down sequence and its next adjacent power up sequence.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the controller 2 is depicted in FIG. 3 to be a display driver IC that may drive an LCD panel, the controller 2 may alternatively be designed to provide the needed boosted output $V_{out}$ to drive other types of devices, e.g. a memory or storage controller driving a data storage device, a sensor controller for managing an array of sensor devices. The description is thus to be regarded as illustrative instead of limiting.

What is claimed is:

1. A method for alleviating overvoltage on a charge pump power supply node, comprising:
   generating a power control signal, which signifies that first and second power supply nodes may be powered down, wherein the first and second power supply nodes are to be selectively connected by a charge pump driver circuit to first and second nodes, respectively, of a flying capacitor; and in response to generating the power control signal, disconnecting the second power supply node from the second node of the capacitor and then discharging the second node of the capacitor, wherein during power down, following discharging of the second node of the capacitor, the negative power supply voltage goes to zero before the positive power supply voltage drops to zero.

2. The method of claim 1 further comprising, in response to generating the power control signal, disconnecting the first power supply node from the first node of the capacitor and then discharging the first node.

3. The method of claim 1 wherein the first and second power supply nodes are to receive negative and positive power supply voltages, respectively.

4. The method of claim 1 further comprising:
generating a further power control signal, which signifies that the first and second power supply nodes may be powered up, and in response releasing the second node of the capacitor and then selectively connecting, by the charge pump driver circuit, the first and second supply nodes to the first and second nodes, respectively, of the flying capacitor.

5. The method of claim 4 wherein said power control signal and said further power control signal are the same signal.

6. The method of claim 5 wherein the same signal is a power enable signal that toggles to indicate a request to power down and to indicate a request to power up.

7. An electronic system comprising:
a controller having first and second power supply nodes, the controller having control logic that is to generate a power control signal that requests an external power supply circuit to power down the first and second power supply nodes;
a flying capacitor;
a charge pump driver circuit having a first charge switch that couples a first node of the capacitor to the first power supply node, and a second charge switch that couples a second node of the capacitor to the second power supply node; and
control circuitry that is coupled to open the second charge switch and discharge the second node of the capacitor, in response to the power control signal.

8. The system of claim 7 wherein the controller is an integrated circuit display driver.

9. The system of claim 8 further comprising:
a power management unit, PMU; and
a system on a chip, SoC, that is to provide the controller with address, data, and control signals for driving a display panel, and wherein the SoC is to command the controller to power down the display panel in response to which the power control signal is generated by the controller, and the PMU is to respond to the power control signal by powering down the first and second power supply nodes.

10. The system of claim 9 wherein the first supply node is to receive a negative power supply voltage, and the second supply node is to receive a positive power supply voltage.

11. The system of claim 10 wherein the PMU is to, during power down, bring the negative power supply voltage to zero before dropping the positive power supply voltage to zero, in response to the power control signal.

12. The system of claim 7 wherein the control circuitry is to also open the first charge switch and discharge the first node of the capacitor, in response to the control signal.

13. The system of claim 12 wherein, the control circuitry comprises an n-channel field effect transistor coupled to discharge the second node of the capacitor, and a p-channel field effect transistor coupled to discharge the first node of the capacitor.

14. The system of claim 12 wherein the control signal is a binary power enable signal that when asserted requests a power management unit to provide a negative voltage on the first power supply node, and a positive voltage on the second power supply node.

15. The system of claim 14 wherein the control circuitry is to open the first and second charge switches, and discharge the first and second nodes of the capacitor, in response to the power enable signal being deasserted.

16. The system of claim 14 wherein the control circuitry comprises an n-channel field effect transistor coupled to discharge the second node, and a p-channel field effect transistor coupled to discharge the first node, of the capacitor and wherein the control circuitry comprises logic gate circuitry having an input coupled to the power enable signal and another input coupled to a binary reset signal, the logic gate circuitry having an output that is coupled to control the n-channel and p-channel transistors.

17. The system of claim 16 wherein the control circuitry comprises a special inverter having an input coupled to the output of the logic gate circuitry and an output coupled to control the p-channel transistor, wherein the output of the special inverter produces a voltage that has opposite polarity of the voltage at its input.

* * * * *